May 20, 1958  H. B. VINCENT ET AL  2,835,623
METHOD OF FORMING A UNITARY PANEL OF GLASS BLOCKS
Filed Aug. 24, 1955
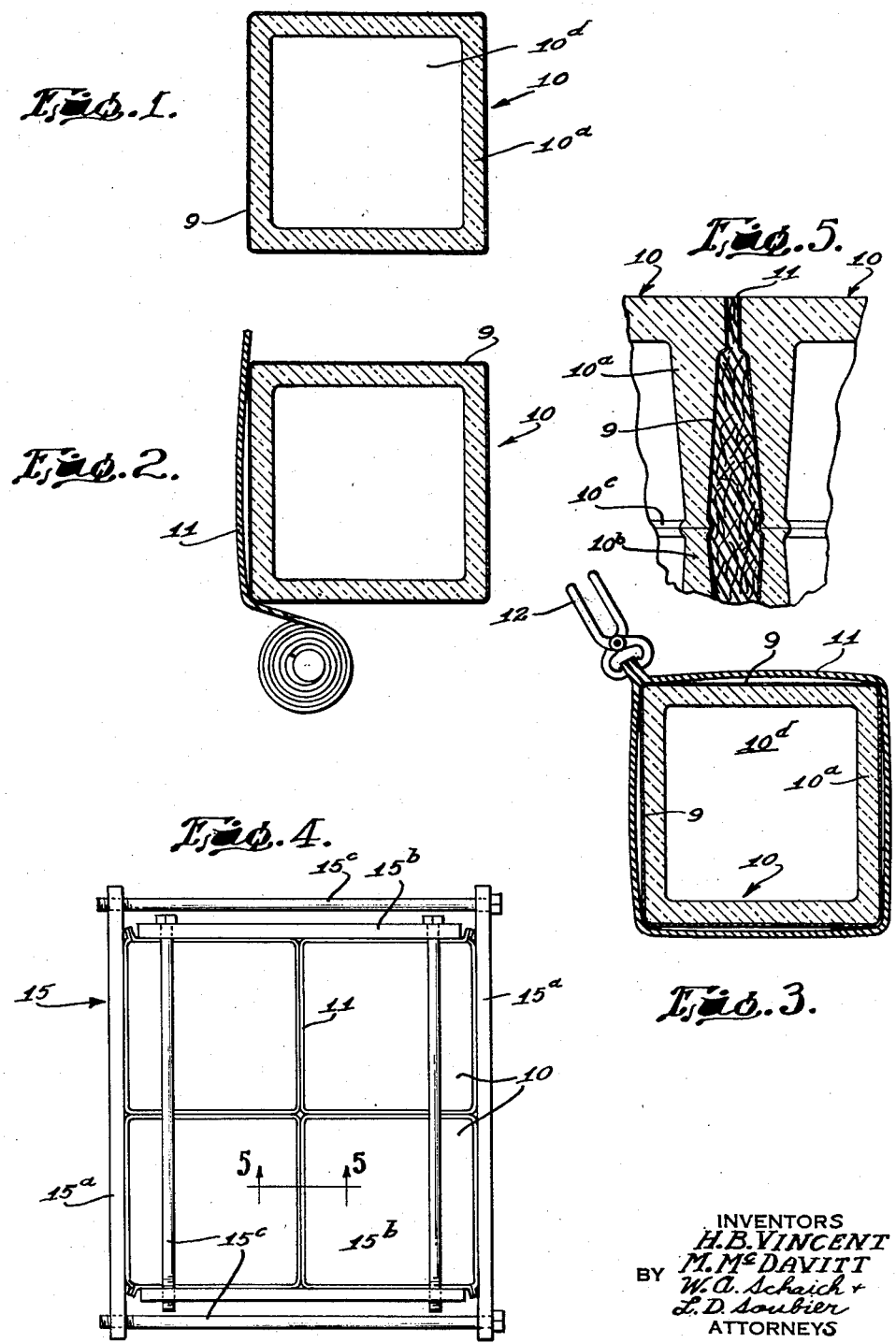
INVENTORS
H. B. VINCENT
M. McDAVITT
W. A. Schaich +
L. D. Soubier
BY
ATTORNEYS

United States Patent Office 2,835,623
Patented May 20, 1958

2,835,623

METHOD OF FORMING A UNITARY PANEL OF GLASS BLOCKS

Harvard B. Vincent and Murray McDavitt, Toledo, Ohio, assignors to Owens-Illinois Glass Company, a corporation of Ohio Application August 24, 1955, Serial No. 530,298

4 Claims. (Cl. 154—118)

This invention relates to an improved method for forming unitary panels of a plurality of glass blocks, and particularly to a novel process for providing a waterproof and weatherproof bond between the adjacent surfaces of the blocks forming the unitary panel.

Glass blocks have long been utilized as structural elements of exterior building walls and roof decks. For construction convenience, it is desirable that the blocks be installed in panels consisting of four or more individual block elements, rather than the more laborious procedure of individually setting each block with mortar. However, the mortars commonly employed with glass block have shown great susceptibility to weather deterioration. Furthermore, the mortar bonded structures have been deficient in structural strength and stiffness, particularly when the resulting panel is utilized as a skylight. To overcome these deficiencies, metal reinforcing members have been inserted in the bonding material between the blocks, and adhesives of various types have been utilized on the exposed surfaces of the bond to provide weatherproofing. This expedient is costly, detracts from the thermal insulation effectiveness of the glass block panel and, because of the substantial width of the resulting bond, reduces the percentage of light transmitting area of the resulting panel.

Accordingly, it is an object of this invention to provide an improved process for producing a unitary panel of a plurality of glass block elements.

A further object of this invention is to provide an improved method for bonding glass block elements into a unitary panel by utilizing a fiber-reinforced plastic resin tape which can be conveniently wrapped around the bonding edges of each glass block.

The specific nature of this invention, as well as other objects and advantages, will become apparent to those skilled in the art from the following detailed description, taken in conjunction with the annexed sheet of drawings, on which, by way of preferred example only, is illustrated one embodiment of this invention.

Fig. 1 is a vertical sectional view of a typical glass block to the bonding surface of which a plastic resin coating has been applied as the first step of the process embodying this invention;

Fig. 2 is a view similar to Fig. 1 but illustrating the application of the plastic resin tape to the resin coated bonding surfaces of the block;

Fig. 3 is a view similar to Fig. 2 but illustrating schematically the step of securing the edges of the tape enwrapping the block;

Fig. 4 is a schematic view of a press for applying pressure to the formed panel during the heating or baking step;

Fig. 5 is an enlarged scale partial sectional view of the resulting joint produced between adjacent blocks of a panel.

Referring to the drawings there is shown a conventional glass block 10 which is formed of two identical cup-shaped portions 10a and 10b which are integrally united at their edges by a fused joint 10c (Fig. 5). The front face (not shown) and the rear face 10d of the block are normally utilized to transmit light from the exterior to the interior of the structure of which the block forms a wall or ceiling.

In accordance with one embodiment of this invention, the bonding edges of the block 10 are provided with a coating 9 of a plastic resin having the characteristics of good adherence to glass and a softening temperature substantially below the annealing temperature of the glass block. Silicones, polyester resins, epoxy resins and similar thermo-setting resins can be utilized, or polyvinyls, such as polyvinyl butyral, or similar thermoplastic resins. As the primary step in this improved process, a tape 11 is formed of one of the above-mentioned resins which is bondable with the coating resin 9 and such tape is reinforced by fibrous materials to provide the necessary high strength. Glass fibers are preferred for such reinforcing material, although other non-inflammable fibers can be utilized. For example, silicone resins reinforced with glass fibers provide a tensile strength on the order of 35,000 to 40,000 p. s. i.

The fiber reinforced resin tape 11 is wrapped around the bonding edges of the block 10 in the manner illustrated in Fig. 2, and the ends of the tape are suitably secured together in a convenient manner, such as by the application of a clamping pressure by a pair of heated tongs 12, as illustrated in Fig. 3.

The tape-wrapped blocks are then assembled into a panel of the desired dimensions, and, as illustrated in Fig. 4, the resulting panel is placed in a form 15 schematically represented by vertical clamping bars 15a, horizontal clamping bars 15b, and cooperating clamping bolts 15c. With such form, the blocks are pressed into tight engagement, and the tape wrappings are firmly compressed between the adjacent surfaces of the blocks and between the blocks and the form 15. The form is then subjected to a temperature sufficient to produce a softening of the resin, if a thermoplastic resin is utilized, or the thermo-setting of the resin, if that type of resin is utilized. The resulting joint is illustrated in Fig. 5 and comprises a unitary mass of fibrous-reinforced resin which securely unites all of the adjacent surfaces of the individual blocks forming the panel.

As an alternate procedure, the block may be wrapped by a tape of the fibrous material and a resin then applied to the tape and block surfaces in liquid form as by dipping each edge of the block to a controlled depth. If desired, a strip of flashing material, such as copper, may be incorporated around the perimeter of the panel and integrally bonded to the fibrous resinous material during the pressure molding step.

It will, of course, be understood that various details of procedure may be modified through a wide range without departing from the principles of this invention, and it is, therefore, not the purpose to limit the patent granted hereon otherwise than necessitated by the scope of the appended claims.

We claim:

1. The method of forming a unitary panel of a plurality of glass blocks comprising the steps of coating the edges of each block with a layer of a primary resinous material having the properties of good adhesion to glass and a softening temperature substantially below the annealing point of the glass block, then peripherally wrapping the edges of each block with a tape formed of glass fibers impregnated with a second resinous material bondable with said primary resinous material, assembling said tape wrapped blocks in a panel, and simultaneously heating and pressing said assembled blocks together to unite said resinous materials.

2. The method of forming a unitary panel of a plurality of glass blocks comprising the steps of peripherally wrapping the edges of each block with a tape formed of glass fibers impregnated with a resinous material having the properties of good adhesion to glass and a softening temperature substantially below the annealing point of the glass block, and then assembling said tape wrapped blocks in a panel, and simultaneously heating and pressing said assembled blocks together to unite said resinous materials.

3. The method of forming a unitary panel of a plurality of glass blocks comprising the steps of peripherally wrapping the edges of each block with a tape formed of glass fibers, impregnating said tape with a liquid resin having the properties of good adhesion to glass and a softening temperature substantially below the annealing point of the glass block, and then assembling said tape wrapped blocks in a panel, and simultaneously heating and pressing said assembled blocks together to unite said resin impregnated fibers.

4. In assembling glass blocks in panel form utilizing a matrix of fiber reinforced plastic resin, the steps of individually wrapping the peripheral edges of each block with a tape formation, said tape being comprised of a fiber reinforced resin material adapted to bond with said blocks under the influence of heat, positioning said blocks in side-by-side relationship, and then simultaneously applying heat and pressure thereto to form a panel.

References Cited in the file of this patent

UNITED STATES PATENTS

| | | |
|---|---|---|
| 1,686,161 | Liese | Oct. 2, 1928 |
| 2,052,229 | Hyde | Aug. 25, 1936 |
| 2,112,241 | Hyde | Mar. 29, 1938 |
| 2,229,317 | Van Cleef | Jan. 21, 1941 |
| 2,303,125 | Knight | Nov. 24, 1942 |
| 2,496,406 | Patrick | Feb. 7, 1950 |
| 2,680,272 | Radke | June 8, 1954 |
| 2,703,486 | Ford | Mar. 8, 1955 |